United States Patent [19]

Castillo

[11] Patent Number: 5,021,255

[45] Date of Patent: Jun. 4, 1991

[54] PROCESS OF MAKING CHEESE CROQUETTES

[76] Inventor: Rene Castillo, 101 SW. 129th Ave., Miami, Fla. 33184

[21] Appl. No.: 445,158

[22] Filed: Dec. 6, 1989

Related U.S. Application Data

[63] Continuation of Ser. No. 150,608, Feb. 1, 1988, abandoned.

[51] Int. Cl.$^5$ .............................................. A23 19/086
[52] U.S. Cl. .................................... 426/582; 426/583
[58] Field of Search ................................ 426/582, 585

[56] References Cited

U.S. PATENT DOCUMENTS 3,741,774  6/1973  Burkwall, Jr. ..................... 426/582
3,840,672  10/1974  Kasik et al. ......................... 426/582

*Primary Examiner*—Marianne Cintins
*Assistant Examiner*—Helen Pratt
*Attorney, Agent, or Firm*—Larson and Taylor

[57] ABSTRACT

A cheese croquette product which is composed of mix of a first and second main mixture. In one example, the first main mixture is composed of two component mixtures, a first heated component mixture of 4 pounds of vegetable oil, ½ pound salt and ¼ ounce yellow dye heated in 8 liters of water. This first hot component mixture is then mixed with a second component mixture composed of 20 pounds of flour, 1 and ½ pounds Romano cheese and 2 ounces of mono sodium glutamate. The first main mixture may be stored and later mixed when desired with a second main mixture. The second main mixture is composed of about 42 pounds cream cheese, 2 pounds non-fat milk, and 4 pounds Romano cheese. The product of the two main mixtures is then cut and shaped into croquette sized portions which may then be breaded in a conventional manner.

4 Claims, No Drawings

PROCESS OF MAKING CHEESE CROQUETTES

This application is a continuation of application Ser. No. 150,608, filed Feb. 1, 1988, now abandoned.

FIELD OF THE INVENTION

This invention relates to cheese product to be frozen for subsequent use to make cheese croquettes and more particularly to a recipe for making such a croquette cheese product.

BACKGROUND OF THE INVENTION

It has been found that a cheese croquette shaped and formed is a highly desirable and tasty food and this invention presents a formula and recipe for making such croquettes. The croquettes are adapted to be frozen and utilized when desired. Additionally, the mixtures which make up the main components of the recipe may be prepared in quantity and stored for subsequent use. The cheese croquette is a mixture of edible oil, such as vegetable oil, water, wheat flour and cream cheese which is preferably seasoned with seasoning ingredients and preferably including Romano cheese and milk in powdered form.

OBJECT OF THE INVENTION

It is, accordingly, an object of this invention to provide an improved cheese croquette product and recipe for making the same which is excellent in taste and the ingredients of which may be stored while awaiting use.

DESCRIPTION OF THE PREFERRED EMBODIMENT

In a preferred embodiment, as a first example, in a separate vessel, 4 pounds of vegetable oil are mixed with 8 liters of water and ½ pound of salt together with ¼ ounce of yellow dye. This mixture is then brought to a boil for at least three minutes. The following described mixture is also prepared. It is composed of 20 pounds of wheat flour, 1 and ½ pounds of Romano cheese and 2 ounces of monosodium glutamate which are thoroughly mixed. The two foregoing mixtures are then mixed together for about three minutes or so until thoroughly mixed to form a first main mixture. This first main mixture is allowed to cool and may be stored in a refrigerated unit for mixture at selected times with a second main mixture now to be described. The second main mixture is composed of 42 pounds of cream cheese, 2 pounds of non-fat milk powder and 4 pounds of Romano cheese. These ingredients are mixed together for about ten minutes and may also be stored in a refrigerated condition until it is desired to make the croquettes. When it is desired to cut and shape the cheese croquettes, the first main mixture and the second main mixture are mixed together thoroughly and, thereafter, cut and shaped to form individual cheese croquettes. These croquettes may then be breaded using conventional ingredients.

In a second example, the first main mixture is prepared as set forth above and mixed with a second main mixture which is composed of 40 pounds of cream cheese, 2 pounds of non-fat milk powder and 4 pounds of Romano cheese which are mixed together for about ten minutes thoroughly and stored until ready for use in a mixture with the first main mixture.

As a third example, 38 pounds of cream cheese are mixed with 2 pounds of non-fat milk powder and 4 pounds of Romano cheese for about ten minutes to form the second main mixture which is then cooled and stored. This mixture is then mixed when desired with the first main mixture to form the mixture which is then cut and shaped to form the cheese croquettes to be subsequently breaded.

While this invention has been described in what is considered a practical and preferred series of three examples, it is recognized that departures may be made within the spirit and scope of this invention which is therefore not to be limited except as set forth in the claims which follow within the doctrine of equivalents.

What is claimed is:

1. A method of forming a product used in making cheese croquettes which comprises:
    (a) forming a first component mixture by blending substantially 4 pounds of edible oil, ½ pound of salt, ¼ ounce of yellow dye and 8 liters of water and bringing the ingredients to a boil;
    (b) forming a second component mixture by blending 20 pounds of wheat flour, 1½ pounds of Romano cheese and 2 ounces of monosodium glutamate;
    (c) thoroughly mixing together said first component mixture and second component mixture to form a first main mixture;
    (d) storing said first main mixture under refrigeration;
    (e) forming a second main mixture by thoroughly blending together substantially 38 to 42 pounds of cream cheese, 2 pounds of non-fat milk and 4 pounds of Romano cheese;
    (f) storing said second main mixture under refrigeration;
    (g) thoroughly mixing together said first main mixture and said second main mixture and separating the resulting mixture in croquette-size portions shaped in generally cylindrical form.

2. A method according to claim 1 wherein said first and second component mixtures are thoroughly mixed together for at least approximately three minutes.

3. A method according to claim 1 wherein the ingredients of said first component mixture are brought to a boil for at least substantially three minutes.

4. A method according to claim 1 wherein the ingredients of said second mixture are mixed together for substantially ten minutes.

* * * * *